US008502761B2

(12) United States Patent
Bovet et al.

(10) Patent No.: US 8,502,761 B2
(45) Date of Patent: Aug. 6, 2013

(54) TRANSPARENT COMPONENT WITH SWITCHABLE REFLECTING ELEMENTS, AND DEVICES INCLUDING SUCH COMPONENT

(75) Inventors: Christian Bovet, Charenton le Pont (FR); Jean Paul Cano, Charenton le Pont (FR)

(73) Assignee: Essilor International, Charenton le Pont (FR)

( * ) Notice: Subject to any disclaimer, the term of this patent is extended or adjusted under 35 U.S.C. 154(b) by 597 days.

(21) Appl. No.: 12/812,066

(22) PCT Filed: Jan. 8, 2009

(86) PCT No.: PCT/FR2009/050016
§ 371 (c)(1),
(2), (4) Date: Jul. 8, 2010

(87) PCT Pub. No.: WO2009/138604
PCT Pub. Date: Nov. 19, 2009

(65) Prior Publication Data
US 2010/0283774 A1 Nov. 11, 2010

(30) Foreign Application Priority Data

Jan. 11, 2008 (FR) ...................................... 08 50153

(51) Int. Cl.
*G09G 3/36* (2006.01)
(52) U.S. Cl.
USPC .......................................................... 345/87

(58) Field of Classification Search
USPC ............................................................ 345/87
See application file for complete search history.

(56) References Cited

U.S. PATENT DOCUMENTS

| 5,099,343 | A | * | 3/1992 | Margerum et al. | ............. 349/63 |
| 6,043,799 | A | | 3/2000 | Tidwell | |
| 6,118,420 | A | | 9/2000 | Yamamoto et al. | |
| 6,847,428 | B1 | * | 1/2005 | Sekiguchi et al. | ............. 349/139 |
| 2008/0007952 | A1 | * | 1/2008 | Iwane | ........................... 362/277 |

FOREIGN PATENT DOCUMENTS

| EP | 0399506 | 5/1990 |
| EP | 1213601 | 6/2002 |
| EP | 1876490 | 1/2008 |

* cited by examiner

*Primary Examiner* — Latanya Bibbins
(74) *Attorney, Agent, or Firm* — Occhiuti Rohlicek & Tsao LLP

(57) ABSTRACT

The invention relates to a transparent component (100) comprising active members (10) that are juxtaposed in parallel to a surface of the component, and that are each switchable between a transparent state and a reflecting state. Each active member establishes a light path between a light passage opening and a side of the component when said active member is reflecting. An addressing system (2) further controls the switching of the active members so that a reduced number of active members is simultaneously reflecting. Therefore, an image formed by transparency through the component thus appears permanently and continuously. Such a transparent component can be used for making an image superimposition device and an image display and storage device.

27 Claims, 5 Drawing Sheets

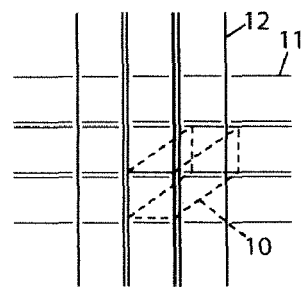
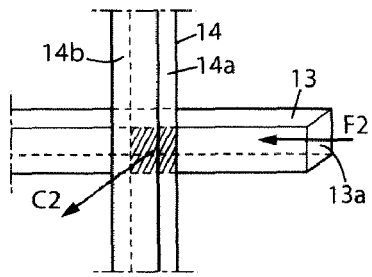
FIG. 2a  FIG. 2b
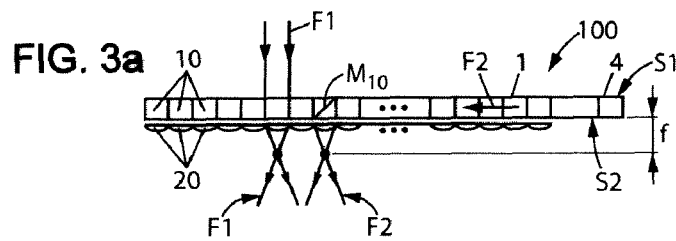
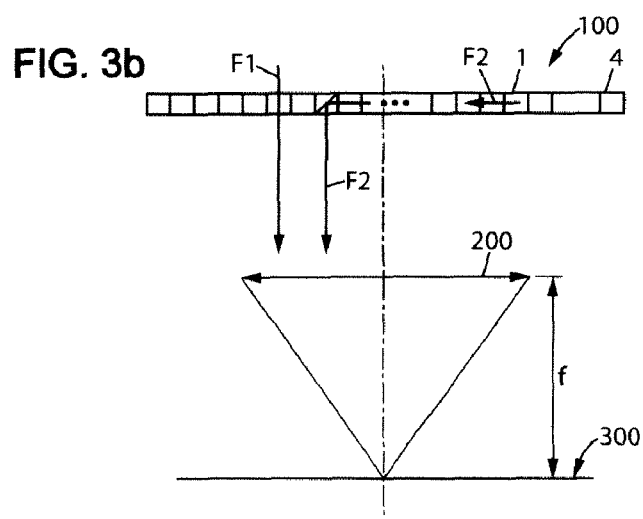

TRANSPARENT COMPONENT WITH SWITCHABLE REFLECTING ELEMENTS, AND DEVICES INCLUDING SUCH COMPONENT

CROSS-REFERENCE TO RELATED APPLICATIONS

This application is the National Stage of International Application No. PCT/FR2009/050016, filed on Jan. 8, 2009, which claims the priority of French Application No. 0850153 filed on Jan. 11, 2008, the contents of which are incorporated herein by reference in their entirety.

The present invention relates to a transparent component with reflecting elements that are switchable, and to devices that include such a component.

Many components already exist that can be used to produce images by modulating a light that is transmitted through these components in a variable manner between different points. Such components are commonly called light modulators. They consist of active elements that are juxtaposed parallel to a surface that is usually flat, and that can be adjusted between a transparent individual state and an opaque individual state. Each active element constitutes a point of an image which is produced by the component, and is commonly called pixel. These components are distinguished by the operating principle of the active elements. Said operating principle may be electrophoretic or liquid-crystal-based in particular. Each of these components must be associated with a light source to produce an image by transmitting the light from the source through the active elements. It is therefore transmissive, but it is not transparent because it does not allow a scene situated on one side of the component to be viewed by an observer situated on the other side of the component. Furthermore, the images that are produced by a component of this type are, in principle, situated inside the component itself, at its pixel location.

There are also components designed to form images, that each consist of a matrix of micromirrors arranged on micro-electro-mechanical systems. Each micro-electro-mechanical system, or MEMS, controls the orientation of a micromirror which reflects an elementary portion of a light beam toward a projection optic, or else deflects it outside this optic. Each micromirror forms, with the microsystem that is associated with it, a pixel of the projected image. These MEMS-based components, called "digital light processors", operate by reflecting light that is produced by a source and are not therefore transparent. The images that are produced by such an MEMS-based component are situated at the location of the matrix of micromirrors.

Document U.S. Pat. No. 6,118,420 describes display systems that are transparent. They can be used to produce data superimposed on an image that is transmitted by transparency. For this, light is injected into the systems through their thickness, and the plates that support the electrodes serve as guides for this light. Active elements switch between a transparent state and a diffusing state to display the data.

Document EP 1 213 601 relates to a system in which a pattern displayed superimposed on the image that is transmitted by transparency is determined initially by the shape of an electrode. The active medium consists of transparent inclusions distributed in a liquid crystal, and switches at the point of the pattern between a transparent state and a diffusing state.

In the systems of these two documents, the data or the patterns that are displayed superimposed have an image plane that is situated at the location of the active medium, inside the systems.

One object of the present invention is to provide a component that is transparent to enable a scene to be observed through it without significantly degrading its quality, and that is capable of simultaneously producing, away from the component, an independent additional image of the scene observed by transparency. Thus, the component according to the invention makes it possible to view at the same time the image by transparency and the additional image, the latter being projected beyond the component. The simultaneous viewing of the two images is possible because their respective positions do not require an observer to modify his accommodation significantly, to view each of the images. In this first application of the invention, the additional image is projected by performing a scan of active elements distributed in the component, to preserve its transparency.

Another object of the invention is to store an image that is perceived simultaneously by transparency through the component, without disturbing the observation and the quality of the image observed transparently. In this second application of the invention, active elements distributed in the component are switched in a variable manner, to direct a portion of the light from the image to a detector without permanently obstructing a point of the field of views. The component then provides an image capturing function.

To this end, the invention proposes a component that is transparent in that it is adapted to transmit, through a surface of this component, light rays that are originating from a scene situated on a first side of the component to form a first image representative of the scene and visible on a second side of the component. This component comprises:

a set of active elements that are juxtaposed parallel to the surface of the component and that are each switchable between a transparent individual state and a reflecting individual state;

an addressing system that is connected to each active element and that is suitable for controlling a switching of this element;

at least one light passage opening; and light transmission means that are arranged between the passage opening and the active elements, so that each active element can establish a light path between the light passage opening and one of the sides of the component when this element is in the reflecting state.

The addressing system is further adapted so that a reduced number of active elements are simultaneously in the reflecting state, so that the first image, representative of the scene that is situated on the first side of the component, appears permanently through the component. In practice, the quantity of light originating from the scene that is blanked or reflected by the active elements that are in the reflecting state is not perceptible relative to the overall intensity of the light that is produced by the scene and that is transmitted through the component. Thus, in the context of the invention, the active elements can be likened to reflecting or semi-reflecting plates, the latter being able to be alternately transparent by switching, and their arrangement within the component enables them to be fully reflecting on an observation axis.

This apparent transparency of the component, which is permanent while it is being used, makes it compatible with many applications. In particular, the component may be incorporated in a windshield, a mirror, a window glass, a camera device, an optical appliance, an optical lens, etc.

Furthermore, according to the invention, the light transmission means and the active elements are arranged to optically conjugate points of an additional optical field that is situated on one and the same side of the light transmission means as the light passage opening with respective points that are situated outside and at a distance from the component, on its first or second side. In other words, the component provides an additional optical path, in addition to its transparency between its two opposite sides. This additional optical path connects the additional optical field to one of the two sides of the component, by optical conjugating. To this purpose, the reflection that is produced by the active elements in the reflecting state is specular, that is to say that any diffuse reflection intensity is insignificant and does not participate in the optical function of the component.

The component according to the invention therefore represents a reflecting and transparent device. This device is capable of presenting by reflection all or part of an image, the latter being perceptible by transparency through the component. Within the component, its constituent active elements thus have two functions: a light reflection function and a light transmission function, the switchover between these two functions being controlled variably by the addressing system which is present within the component.

A component according to the invention may also have small dimensions. Its small size then means that it can be incorporated in a portable individual device such as a viewing instrument, for example a pair of binoculars or a camera view finder, a pair of glasses, a helmet visor, a protection or sports mask lens, etc.

According to a refinement of the inventive component, the addressing system can also be adapted so that the reflecting state of at least some of the active elements is intermittent, with the reflecting state of each active element having a finite duration and with a frequency for changing the active elements that are switched. In particular, the active elements can thus be switched by scanning. The component then appears to be globally transparent at all points of its surface.

The active elements may be of different types, depending on the physical principle of the reflecting state. This reflecting state may be based in particular on a reflection of metal or semi-reflecting mirror type, or on a reflection by Bragg effect, or even on a waveguide breakdown effect. Among the active elements of the metal or semi-reflecting mirror type, mention may be made of those based on nematic liquid crystals, those based on a polymer matrix which incorporates dispersed droplets of a liquid crystal, those with bubble displacement in a liquid, or even those with electrowetting. The active elements that comprise cholesteric liquid crystals are of the type with Bragg reflection. Finally, active elements that are based on a waveguide breakdown effect may each comprise a waveguide portion and a transparent lateral portion which are in contact with one another, the lateral portion having a refractive index that varies between two values respectively lower than or equal to and higher than or equal to the value of the refractive index of the waveguide.

By virtue of the potentially very small size of such active elements, the component of the invention can satisfy demanding esthetic criteria, and in particular those of ophthalmic applications. Preferably, at least some of the active elements have dimensions that are less than 2 mm (millimeters), even less than 0.5 mm, parallel to the surface of the component.

Advantageously, the active elements may be juxtaposed in the surface of the transparent component in a matrix arrangement. In this case, the light transmission means may themselves comprise intermediate active elements that are each switchable between a transparent individual state and a reflecting individual state, and that are each arranged between the light passage opening and one end of a line or a column of the matrix arrangement. Each intermediate active element can thus establish an optical connection between the light passage opening and one of the active elements of the corresponding column or line when it is in the reflecting state.

The invention also proposes two devices that use a transparent component as described previously, and that are intended for different applications.

A first of these devices can be used to overlay two different images. It comprises, in addition to the transparent component, a light source that is arranged to produce light through the passage opening of the component so that this light can be reflected by at least one of the active elements toward the second side of the component. In this way, a second image is formed from a pattern that is situated in the additional optical field, this second image being visible on the second side of the component and appearing overlaid on the first image. In particular, the second image is not formed in the plane of the component but beyond the component. The first image results from the apparent transparency of the component. It reproduces the scene that is situated on the first side of this component and is visible from the second side. The second image is reflected by the active elements that are in the reflecting state. In other words, the device makes it possible to introduce, into the optical path of transmission of the first image through the component, a supplementary light that produces the second image outside the component. Thus, in the context of the invention, the term "image overlay" should be understood to mean the coexistence of two images outside the component, without either of the two images being situated in the plane of the component. Given that the two images are situated on the same first side of the component, and visible from the same second side of the component, they do not require any movement of a user of the device, nor any significant variation of visual accommodation on his part, to perceive the two images. Thus, the two images can be viewed simultaneously, and are overlaid.

In such an image overlaying device, the addressing system can further be adapted to successively control switchovers of different active elements, so as to produce the second image by scanning the active elements. Furthermore, the duration of the reflecting state of each active element and the frequency for changing the active elements that are switched are adapted so that the second image appears continuous and/or permanent. By virtue of this method of introducing light that produces the second image, the visibility of the first image through the transparent component is not affected.

The two images are overlaid when they are detected or observed on the second side of the component. In particular, the second image may appear superimposed on the first image if the lighting that is produced by the light source is greater than that which is produced by the scene. The second image may be, for example, a view finding pattern, an inscription of alphanumeric data, graphics, a reproduction of instrument panel elements, multimedia communication elements, etc.

The duration of the reflecting state of each active element and the frequency for changing the active elements that are switched may be adapted in different ways depending on the image detection mode. In practice, for the second image to appear continuous, these parameters may be adjusted according to a remanence time and/or a response time specific to the detection system used. Thus, for applications such as an ophthalmic lens, a mask lens, a helmet visor, an ocular visor, a windshield with head-up display or a window, they may be adjusted for a user of the device observing the first and second images with the naked eye. In particular, the time between two successive switchovers of one and the same active element to the reflecting state may be less than the observer's retinal remanence time. In the case of an ophthalmic lens, the active elements may also be adapted to correct an ametropia of a wearer of the lens observing at least one of the first and second images.

For other applications, such as an optical lens of a video recording system, they can be adjusted according to a response time of an image detector which is placed on the second side of the transparent component.

A second device according to the invention, which corresponds to a distinct application of the transparent component, makes it possible to simultaneously view and store one and same image. Such a device comprises, in addition to the transparent component:

a photosensitive detector, which is arranged in the additional optical field of the component to receive, through the passage opening of the component, light that originates from the scene and that is reflected by at least one of the active elements during a detection time; and a storage unit that is connected to the detector so as to store light intensities received by the latter.

The addressing system is further connected to the detector and to the storage unit so as to transmit to the latter coordinates of an active element in the surface of the transparent component, which is in the reflecting state during the detection time. Furthermore, the duration of the reflecting state of each active element and the frequency for changing the active elements that are switched are adapted so that the first image formed by the component appears continuous for a user of the device.

Such an image viewing and storage device makes it possible to orient toward the detector a portion of the light that is produced by the scene situated on the first side of the component, without the optical path of transmission of the first image through the component being modified, and without the overall intensity of the first image being perceptibly reduced. The additional optical path that is provided by the inventive component is therefore used to direct toward the detector the portion of the light originating from the scene that is used to store the image of this scene.

It may also form an optical lens, an ophthalmic lens, a mask lens, a helmet visor, an optical view finder, a windshield or a window, a camcorder system, etc. In the case of an ophthalmic lens, the active elements may further be adapted to correct an ametropia of a wearer of the lens observing the first image.

Other particular features and advantages of the present invention will become apparent from the following description of exemplary and nonlimiting embodiments, with reference to the appended drawings in which:

FIGS. 2a and 2b illustrate two possible operations of an active element of the device of FIG. 1;

FIGS. 3a-3c illustrate three possible uses of the device of FIG. 1;

For clarity reason, the dimensions of the elements that are represented in these figures do not correspond to actual dimensions or to actual dimensional ratios. Furthermore, it is understood that these figures are designed to facilitate an understanding of the invention. For this purpose, they do not represent certain optical, production or image processing elements, that are known to those skilled in the art and that can be restored by the reader according to the techniques that are already known and/or the description of the invention given hereinbelow.

Figure 1:
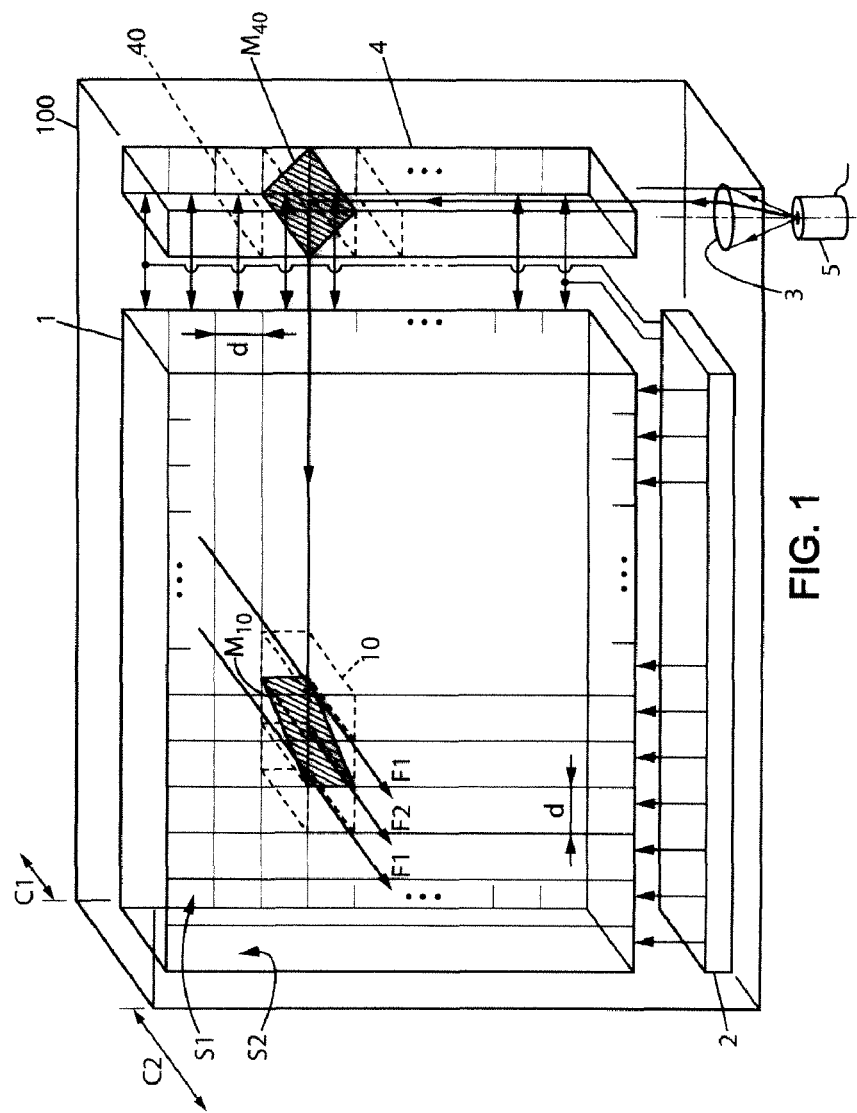
FIG. 1 represents an image overlaying device according to the invention.

A first embodiment of an image overlaying device is described first, with reference to FIG. 1.

This device comprises a component 100 and a light source 5. The component 100 has two parallel external faces S1 and S2 which define two opposite sides of the component. These sides are denoted C1 and C2.

The light source 5 may be a laser diode, a vertical-cavity surface-emitting laser (VCSEL), a light-emitting diode (LED) or a strip of light-emitting diodes. It is preferably of small dimensions and may be collimated if necessary into a quasi-parallel beam. The light from the source 5 penetrates into the component 100 through a light passage opening, reference 3. The opening 3 is situated, for example, on a lateral side of the component 100 between the faces S1 and S2.

The component 100 comprises an active portion 1 which is contained between the two faces S1 and S2. The portion 1 is divided into regions 10, which are juxtaposed parallel to the faces S1 and S2. The regions 10 are preferably arranged in a matrix arrangement, which defines mutually perpendicular addressing lines and columns. Symbolically, and as illustrated in FIG. 1, the addressing lines are defined close to the face S1 of the component 100 and the addressing columns are defined close to the face S2. Each region 10 consists of a part of the active portion 1 which is situated between an addressing line and column, at the location of the intersection of the projections of this line and this column in one and the same plane parallel to the faces S1 and S2. It may have dimensions d that are of the order of 0.5 mm, measured parallel to the faces S1 and S2 of the component 100.

The active portion 1 consists of at least one active material which can locally switch between a transparent state and a reflecting state. The switchover of the active material within a region 10 is controlled via the addressing line and the addressing column that intersect in this region, in a manner that will be explained below with reference to FIGS. 2a and 2b. A region 10, with the corresponding addressing line and column portions, is globally designated for each active element 10.

When an active element 10 is in the transparent state, light rays F1 can pass through the portion 1 from the side C1 to the side C2 of the component 100, at the location of this active element. The rays F1 may possibly be deflected by the portion 1, for example by an optical lens effect. In this way, the component 100 can form an image that is visible on the side C2 of a scene that is situated on the side C1 at a distance from the component 100. It is in this sense that the component 100 is said to be transparent, and not transmissive. The image of the scene can be formed on the side C2 at a determined focus distance, where a screen may be placed to show the image. Alternatively, the image of the scene that is formed by the portion 1 can be situated on the side C1, by being defined by the orientations of the light rays F1 within the side C2. It is then also visible from the side C2. Whatever the position of the image of the scene that is formed by the beams F1, it is often designated hereinafter as image formed by transparency. It corresponds to the first image that was introduced above in the general description of the invention.

In particular, the component 100 may constitute an ametropia-correcting spectacle lens. In this case, the rays F1 are deflected differently between active elements 10 that are distant from one another, so as to correct the ametropia of a wearer of the lens observing the scene situated on the side C1, his eye being situated on the side C2.

When an active element 10 is in the reflecting state, light rays F2 that originate from the opening 3 inside the component 100 are reflected by this active element in the manner of a mirror that is oriented obliquely relative to the faces S1 and S2. Such a mirror is referenced $M_{10}$ in FIG. 1. The active element 10 that is reflecting may not be simultaneously transparent for a ray F1 originating from the scene situated on the side C1. However, given that each active element 10 is of small size and that a single element 10 is reflecting at a given instant, or that a small number of elements 10 are reflecting simultaneously, a main part of the active portion 1 transmits light rays F1 that originate from the scene on the side C1. Thus, the component 100 appears overall transparent. Furthermore, the active elements 10 can be switched to the reflecting state in turn, at an active element change frequency that is adapted so that a user of the component cannot individually distinguish an element 10 that is reflecting at a given instant.

The component 100 also comprises an addressing system 2 which is connected to the addressing lines and columns of the active portion 1.

The component 100 also comprises means 4 suitable for transmitting the light that is produced by the source 5 between the opening 3 and each active element 10, at least while this element is in the reflecting state. As an illustration, these means 4 are represented in FIG. 1 in the form of a column of intermediate active elements 40 that are arranged facing ends of the lines of active elements 10. The intermediate active elements 40 may be similar to the active elements 10, but with an orientation that makes it possible to reflect the light that originates from the opening 3, parallel to the addressing lines. For such an operation of the transmission means 4, a single element 40 is reflecting at a given instant. It is then equivalent to a mirror, referenced $M_{40}$ in FIG. 1, which is oriented roughly at 45° from the addressing lines and columns. Alternatively, the transmission means 4 may comprise a line of intermediate active elements that are arranged facing ends of the columns of the active elements 10.

It is understood that the means of transmitting the light that is produced by the source 5 to the active elements 10 may be of different types. For example, optical fibers may guide the light from the source 5 respectively to the ends of the lines or columns of the active elements 10. An optical switch may then be used to direct the light selectively into one of these optical fibers. Alternatively, a translucent bar may be arranged in place of the column of the intermediate active elements 40. This bar reflects the light toward all the lines of active elements 10 in a constant and regular fashion relative to a displacement parallel to the columns of the elements 10. If necessary, a light trap may be arranged at the other end of the lines of active elements 10, to absorb the light from the source 5 that is not reflected by any element 10 toward the side C2 of the component 100.

Two possible constructions of the active elements 10 are now described as examples, with reference to FIGS. 2a and 2b.

According to a first construction (FIG. 2a), the lines of the matrix arrangement are defined by horizontal electrodes 11 separated and juxtaposed in a first plane, and the columns of the matrix arrangement are defined by vertical electrodes 12 separated and juxtaposed in a second plane. These first and second planes are situated on each side of the active portion 1. The electrodes 11 and 12 are connected to the addressing system 2.

The active material is situated between the planes of electrodes 11 and 12. It may comprise nematic liquid crystals. Each pair of electrodes 11 and 12 is arranged in a fashion that is suitable for modifying an orientation of the liquid crystals that are situated between them. Thus, each switchable active element 10 comprises two portions of electrodes and a portion of active material. The reflecting mirror behavior is produced by a refractive index deviation that appears between two sides of a limit of the nematic liquid crystals oriented obliquely relative to the faces S1 and S2. Preferably, this limit is turned roughly at 45° relative to the faces S1 and S2, about an axis parallel to the addressing columns. The transparent state of the active element corresponds to the elimination of this index deviation. This elimination is controlled by modifying the electrical voltage that is applied between the electrodes 11 and 12 corresponding to the active element concerned. For such an operation, it may be necessary to use a light source 5 that is linearly polarized. Alternatively, a linear polarizer may be arranged in the component 100, for example at the opening 3. In particular, the liquid crystals can switch between a planar orientation and a homeotropic orientation, with respect to the oblique limit. The intensity of the light reflection is then given by the Fresnel equations relating to the light reflection on an interface between two transparent media. In particular, this reflection intensity may be greater than 75%, depending on the angle of incidence of the light relative to the interface, and its polarization.

Given the same arrangement of the electrodes 11 and 12, the material of the portion 1 may alternatively comprise cholesteric liquid crystals. The screw axis of the cholesteric liquid crystals is at an angle of 45° relative to the faces S1 and S2, in a plane parallel to the addressing lines and perpendicular to the columns. In this case, the light from the source 5 is preferably circularly polarized before arriving at the active elements 10. The intensity of the light reflection is then approximately 100% or approximately 50%, depending on whether the source 5 is provided with a circular polarizer or not. According to a refinement of a component 100 with cholesteric liquid crystals, the portion of cholesteric liquid crystals of some of the active elements 10 may be adapted to exhibit a variable screw pitch, when these active elements are each in the reflecting state. These active elements 10 with variable screw pitch have a reflection that is effective over a wider wavelength range, which may be useful in the case of a source 5 of white light, in particular.

The portion of active material that is contained in each element 10 between the electrodes 11 and 12 (FIG. 2a) may thus comprise, according to yet another possible alternative, liquid crystal droplets that are dispersed in a matrix. Such an active material is known by the acronym PDLC, which stands for "polymer-dispersed liquid crystal" when the matrix is based on a polymer material. The reflection of each active element 10, which is specular, is obtained by orienting the liquid crystals within the droplets via an electrical potential difference applied between the two electrodes and 12 which correspond to this element 10. The liquid crystal that is contained in the droplets may be nematic or cholesteric, possibly with a variable screw pitch.

These various types of active elements based on liquid crystals contained between two portions of electrodes are assumed to be known to those skilled in the art. Reference can therefore be made to the numerous documents published on the subject, notably to obtain more details on their operation.

According to a second construction of the active elements 10 (FIG. 2b), the lines of the matrix arrangement are defined by horizontal waveguides 13 and the columns are defined by vertical waveguides 14. The waveguides 13 are offset within the thickness of the component 100 relative to the waveguides 14, and are in contact with the latter at flat intersection interfaces. The waveguides 13 and 14 are arranged within a first transparent material with low light refractive index, which forms a matrix of the portion 1. The waveguides 13 are made of a second transparent material, which exhibits a refractive index that is constant and greater than that of the matrix material. In this way, they can conduct a light beam F2 that is produced by the source 5 and that is introduced into one of their ends 13a, without a perceptible proportion of the light of the beam being transmitted to the matrix material. The waveguides 14 may consist of a third transparent material that has a variable refractive index. The index of each waveguide 14 may be equal to that of the matrix material, or be greater than or equal to the refractive index of the waveguides 13. When the refractive index of the waveguides 14 is equal to that of the matrix material, the light that is produced by the source 5 is enclosed within the waveguides 13 and does not exit via the face S2 of the component 100. However, when the index of one of the waveguides 14 is greater than or equal to that of the guides 13, light that is introduced into one of the waveguides 13 exits from the latter via its intersection interface with the high index guide 14, toward the side C2. In other words, the intersection interface between the two waveguides constitutes a break in the guidance of the light within the waveguide 13 that is fed with light. For example, the waveguides 14 may be made of a polymer matrix in which are dispersed droplets of liquid crystal (PDLC), with droplet diameters that are small enough for the material of the waveguides 14 to appear homogeneous through a mean field effect. The waveguides 14 are then associated with respective electrodes, which are not represented in FIG. 2b and that are used to control the effective refractive index of each of them. For such a construction of the component 100, each active element 10 comprises the two respective portions of a waveguide 13 and of a waveguide 14 that are in contact with one another at the point of the element.

For each construction of the active elements 10, the addressing system 2 can control all the active elements so that at least some of them are in the reflecting state for predetermined times. In particular, it may be adapted to control a switchover of a single active element 10 at a time. This active element 10 then reflects a light beam F2 toward the side C2 of the component 100. A scan of the active portion 1 is produced by successively switching all the active elements 10. If necessary, the intensity of the light that is produced by the source 5 may be varied simultaneously, to obtain variable light levels for each active element 10 when it is activated.

The active portion 1 and the transmission means 4 optically conjugate points of an additional optical field that is situated on the side of the opening 3 with points that are situated on the side C1 of the component 100, outside the latter. Thus, a pattern that is situated in the additional optical field, and that is lit by the source 5, is imaged on the side C1 of the component 100, at a distance from the face S1. This image of the pattern may be real or virtual, depending on the orientation of the mirrors equivalent to the active elements 10 when they are switched to the reflecting state. When these equivalent mirrors direct the beams F2 toward the side C2 of the component, the image of the pattern can be seen by a user whose eye is situated on this side C2 and who is looking toward the side C1 through the component 100. This image that is produced by the beams F2 then appears overlaid on the image of the scene that is formed by the beams F1. The image formed by the beams F2 is hereinafter designated scan image, because of the variation of the active elements 10 that transmit it, and corresponds to the second image that has been introduced into the general description of the invention.

When the transparent component 100 is incorporated in an ophthalmic lens, or itself constitutes such a lens, it may be adapted to correct an ametropia of a wearer of the lens both when this wearer perceives the scan image and when he perceives the image of the scene formed by transparency of the component. Such an ametropia correction for the two images may be produced, for example, by adapting the shape of the face S2 of the component 100. Conversely, an adaptation of the shape of the only face S1 of the component 100 may make it possible to correct the ametropia of the wearer only for his perception of the image of the scene.

It is understood that the active elements 10 may themselves modify the scan image in numerous ways. Such a supplementary function of the active elements 10 can be produced more particularly when these elements comprise portions of a polymer matrix that incorporates dispersed liquid crystal droplets (PDLC). A nature, an orientation and/or a distribution of the droplets in the matrix may in particular be adapted to modify the formation of the scan image.

According to one possible refinement of an image overlaying device as described previously, the active elements 10 of the component 100 may be associated with different colors in groups of at least three adjacent active elements, so as to produce a colored scan image. For example, colored filters may be arranged against each active element 10, on the side C2 of the component. If necessary, fluorescent pigments may be used instead of the colored filters. In the latter case, the source 5 may be replaced by an ultraviolet radiation source. In particular, the RGB system for obtaining colored images may be used.

Alternatively, the active elements 10 may be adapted to reflect white light and a number of transmission systems 4 may be arranged parallel to the input of the lines of the active elements 10. These transmission systems are then arranged to respectively transmit light beams that are produced by sources of complementary colors. These colored beams are transmitted simultaneously to one and the same active element 10 which is in the reflecting state. Compared to the preceding embodiment according to which the color was generated in the active elements 10 themselves, a greater definition and greater brightness may be obtained by using several colored light sources.

According to yet another possibility for obtaining a colored scan image, a time-division multiplexing of colors may be used when the active elements 10 are effective in reflection mode over the entire visible light range.

There now follows a description of three possible uses of an image overlaying device as described previously, with reference to FIGS. 3a-3c. These figures are constructed from plan views of the component 100 as represented in FIG. 1.

According to FIG. 3a, the component 100 may be associated with an array of microlenses 20 that are respectively situated facing the active elements 10 on the face S2 of the component. Each microlenses 20 focuses the beam F1 or F2 that is transmitted by the corresponding active element 10, at a distance f from the face S2 that may be equal to 1 mm for example. The device then constitutes a screen for transparently viewing the scene that is situated on the side C1, and can simultaneously produce a superimposed scan image, visible beyond the plane of the device. If necessary, a diffusing transmissive film, that is not represented in the figure, may be added in the focus plane of the microlenses 20 to increase an angle range of visibility of the two images.

According to FIG. 3b, the component 100 may also be associated with a projection device 200 symbolized by a convergent lens, and with a screen 300. In this case, the focus distance f may be several meters in order to allow a good view of the images by a number of comfortably accommodated people. For this second use, the active elements 10 are advantageously adapted so that the scan image is produced in a plane that is overlaid on the plane of the image formed by transparency of the component 100, when the scene that corresponds to this image by transparency is distant from the component 100. The image of the scene and the scan image are then simultaneously clear, for one and the same focus setting of the projection device 200.

The optical configuration that is illustrated by FIG. 3b also corresponds to a use of an image overlaying device according to the invention when it is incorporated within an ophthalmic spectacle lens. In this case, the lens 200 corresponds to the crystalline lens of a wearer of the lens, and the screen 300 corresponds to his retina.

Figure 3C:
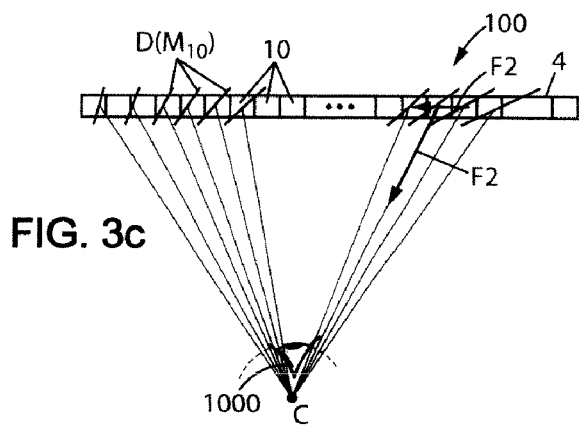

According to FIG. 3c, the component 100 may be viewed by an observer who is fairly close to the component. This observer is represented by his eye 1000. In order to avoid requiring this observer to move to observe all the image that is produced by scanning by the device, the light beams F2 that are successively transmitted by the active elements 10 toward the side C2 of the component 100 may pass substantially through one and the same common point which is denoted C. C is situated on the side C2 of the component 100. In this case, the observer can see all the scan image without moving, simply by turning the eye, when he is placed so that the center of rotation of his eye 1000 is situated approximately at the point C. For this purpose, an orientation of the mirrors $M_{10}$ that are equivalent to the active elements 10 in the reflecting state, denoted $D(M_{10})$ in FIG. 3c, varies progressively along the surface of the component 100 so that the directions of the beams F2 that are reflected by the elements 10 all pass through the point C. Such an adaptation of the component 100 is particularly advantageous when this component is used as a vehicle or airplane windshield, with a display of piloting data that appears superimposed ("head-up display"). It is also advantageous when the component 100 is incorporated in an ophthalmic spectacle lens, a mask lens or a helmet visor.

For this last use of the image overlaying device, the active elements 10 actively participate in the formation of the scan image, by adjusting the direction of emergence of the light beams that form it. They may also, alternatively or in combination, adjust the focus distance of one or other of the two images, or of both. Other functions of the active elements 10, which can participate in the formation of the scan image, can then be implemented. Such functions are preferably generated when the active elements 10 are constructed from liquid crystal droplets dispersed in a polymer matrix (PDLC). In practice, the holographic techniques that are currently available to add extra functions to this type of active element allow for practical and inexpensive productions of refined components 100.

Figure 4:
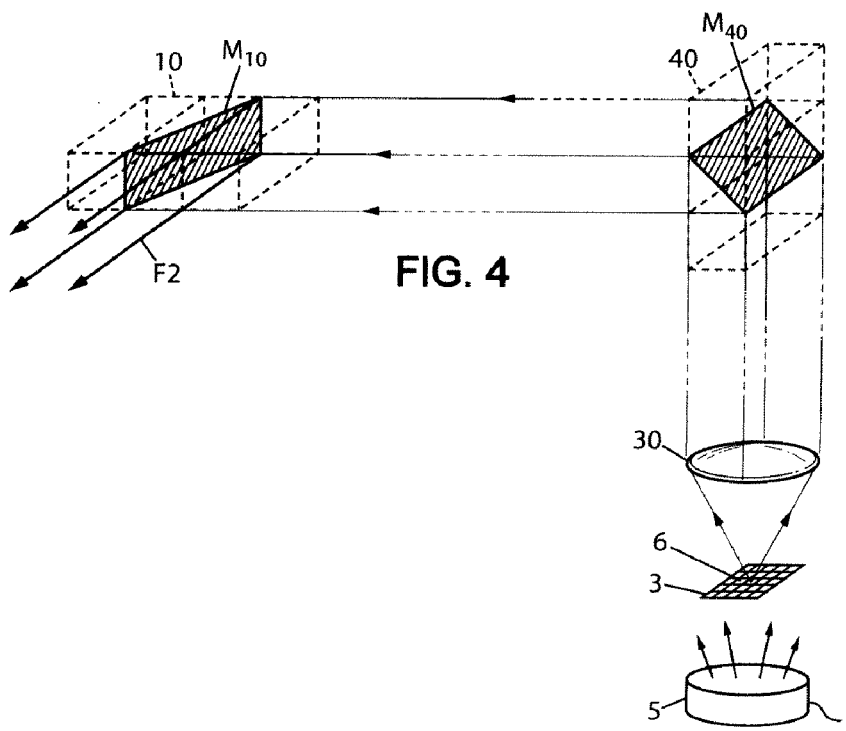
FIG. 4 illustrates a refinement of the device of FIG. 1, which provides enhanced resolution of the second image.

The device represented in FIG. 4 is similar to that illustrated by FIG. 1, but it also comprises a generator of second image portions 6 that is arranged roughly at the location of the opening 3, in the additional optical field. The generator 6 is adapted to form a portion of the second image by locally adjusting the light that is produced by the source 5. For example, the generator 6 may itself comprise a square of 5×5 pixels, these pixels possibly being of the type with light intensity modulation for example. In this case, the generator 6 consists of image dots that each have a variable intensity. The source 5 may be adapted to light, in a substantially uniform manner, the entire surface of the pixels of the generator 6. The entire image portion that is formed by the generator 6 at a given instant is then transmitted by an active element 10 that is simultaneously reflecting. In this way, the image portion is reproduced to be visible from the side C2 of the component 100. The same active element 10 then simultaneously reflects the light that is produced or modulated by all the pixels of the generator 6. For this purpose, an intermediate optical system, which is symbolized by a lens 30 in FIG. 4, may be arranged to adapt the apparent dimensions of the image portion that is produced by the generator 6 to those of an active element 10, and to the aperture of the transmission means 4.

The addressing system 2 is also connected to the generator 6 and is adapted to control the latter to successively form portions of the second image in a determined order. It simultaneously controls synchronized switchovers of the active elements 10 in the same order in the surface of the component 100. Thus, each portion of the second image is reflected by an active element 10 and the second image appears reconstructed for an observer situated on the side C2 of the component 100. In other words, two scans are simultaneously controlled by the addressing system 2: a first scan that displaces a display window of the generator 6 according to contiguous positions within a greater image, and a second scan that changes the active element 10 which is reflecting in the matrix of the component 100. The similarity and the synchronization between these two scans makes it possible to fully restore the second image through the face S2 of the component 100. The mirrors equivalent to the active elements 10 that are switched to the reflecting state may be oriented differently from one another, so as to restore a juxtaposition of the reproduced portions of the second image, which corresponds to the positions of the display window of the generator 6 in the complete image.

Figure 5:
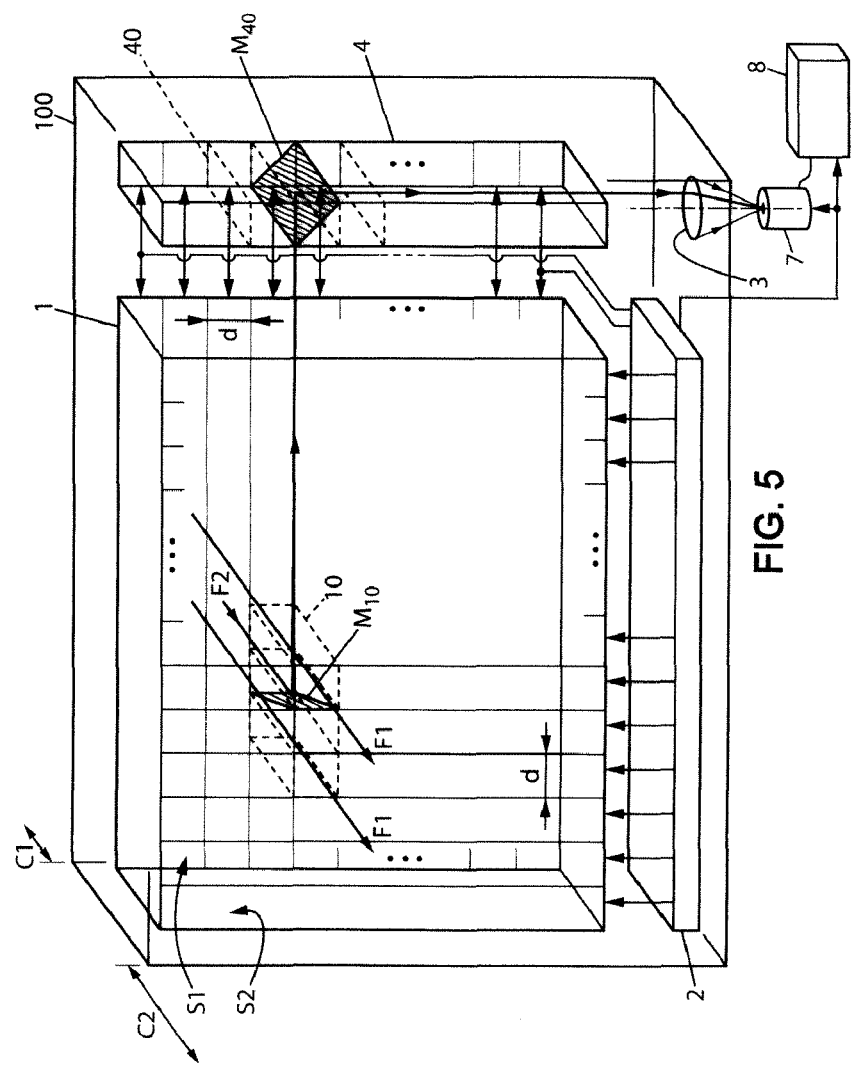
FIG. 5 represents an image viewing and storage device according to the invention.

An image viewing and storage device is now described, with reference to FIG. 5.

This device comprises a component 100 which may conform to one of the embodiments that have already been described above. In comparison to FIG. 1, the component 100 is turned over, so that each active element 10 establishes an optical path between the side C1 of the component 100 and the opening 3. The device comprises, in addition to the component 100, a photosensitive detector 7 and a storage unit 8 which is connected to the detector. The detector 7 is arranged to receive, through the opening 3, light that originates from a scene situated on the side C1 of the component 100, and that is reflected by one of the active elements 10. The addressing system 2 is connected to the detector 7 to synchronize the reflecting state time of one of the active elements 10 of the component 100 with a detection time window of the detector 7. It is also connected to the storage unit 8 to transmit to the latter coordinates of the active element 10 that is reflecting during this detection time window. Thus, the storage unit 8 can store a light intensity value detected in conjunction with the coordinates of the active element 10 that has transmitted this intensity. In this way, the whole of the image of the scene can be stored, by scanning the component surface 100 to switch each active element 10 to the reflecting state. During this scan, the duration of the reflecting state of each active element 10 and the frequency for changing the active elements 10 that are switched are adapted so that the image of the scene that is formed by transparency by the component 100 appears continuous. Furthermore, the intensity of the image of the scene that is perceived from the side C2 of the component 100 is not perceptibly reduced by the storage operation, because a single active element 10 reflects a proportion of the light emitted by the scene at a given instant.

According to a refinement of such an image viewing and storage device, the detector 7 may comprise a matrix of a number of photosensitive elements. The device may then be adapted to store light flux intensities that are reflected simultaneously by a number of active elements 10 toward respective photosensitive elements. The storage time for the entire image of the scene is then reduced, by a factor that is roughly proportional to the number of photosensitive elements than can be simultaneously activated. For this purpose, it is necessary for the means of transmitting light between the active elements 10 and the opening 3 to be adapted to establish a number of parallel independent optical paths. In such an operating mode, any two photosensitive elements of the detector 7 are associated with two different active elements 10 during each detection time window.

Figure 6:
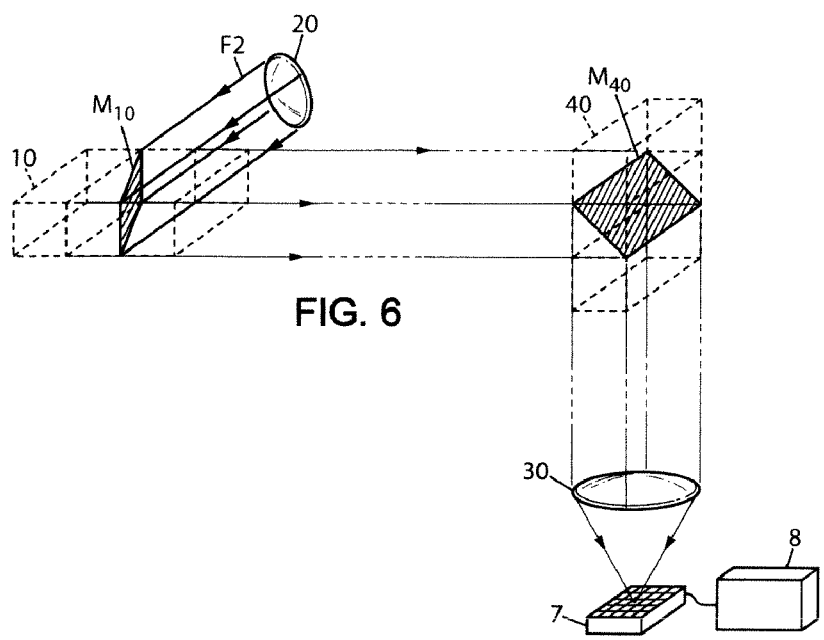
FIG. 6 illustrates a refinement of the device of FIG. 5, which provides enhanced resolution of the stored image.

Another refinement of an image viewing and storage device according to the invention is illustrated by FIG. 6. It corresponds to the principle of resolution multiplication that was explained above with reference to FIG. 4, but by being applied to the image input. The detector 7 again comprises a matrix of photosensitive elements, but the device is now adapted so that a number of photosensitive elements, and preferably all the photosensitive elements of the detector 7, simultaneously receive light that is reflected by one and the same active element 10 at a given instant. In this way, a portion of the image of the scene that is situated on the side C1 of the component 100 can be stored during a single detection time window. This portion is defined by the dimensions of each active element 10, and the photosensitive elements of the detector 7 store in parallel respective light flux intensities that correspond to actual pixels of the image of the scene. For such an operating mode, the component 100 may be associated with an optical system that is placed on the side C1, in order to form an image of the scene on the face S1 of the component.

It is understood that the transparent component that is the main subject of the invention, and the devices that are produced therefrom, can be modified or adapted in many ways while retaining at least some of the advantages of the invention. In particular, it is known that numerous equivalent optical arrangements can produce identical functions.

Furthermore, the addressing system of the transparent component may be adapted to change the active elements that are successively reflecting in varying orders. In particular, the order of scanning of the active elements for an image overlaying device may be adapted according to the image that is produced by scanning.

The invention claimed is:

1. A transparent component adapted to transmit, through a surface of said component, light rays originating from a scene situated on a first side of the component to form a first image representative of said scene and visible on a second side of the component, the component being characterized in that it comprises:
   a set of active elements juxtaposed parallel to the surface of the component and each switchable between a transparent individual state and a reflecting individual state;
   an addressing system connected to each active element and suitable for controlling a switching of said element;
   at least one light passage opening; and
   light transmission means arranged between the passage opening and the active elements, so that each active element can establish a light path between said light passage opening and one of the sides of the component when said active element is in the reflecting state;
the addressing system being further adapted so that a reduced number of active elements are simultaneously in the reflecting state, so that said first image appears permanently through the component, and
the light transmission means and the active elements being further arranged to conjugate optically points of an additional optical field situated on one and the same side of said light transmission means as the light passage opening with respective points situated outside and at a distance from the component, on one of the first or second sides of said component.

2. The component as claimed in claim 1, in which the addressing system is also adapted so that the reflecting state of at least some of the active elements is intermittent, with the reflecting state of each active element having a finite duration and with a frequency for changing of the active elements that are switched.

3. The component as claimed in claim 1, in which the active elements are juxtaposed in the surface of said component in a matrix arrangement.

4. The component as claimed in claim 3, in which the light transmission means themselves comprise intermediate active elements each switchable between a transparent individual state and a reflecting individual state, each arranged between the light passage opening and one end of a line or a column of the matrix arrangement, so that each intermediate active element can establish an optical connection between the light passage opening and one of the active elements of the corresponding column or line when said intermediate active element is in the reflecting state.

5. The component as claimed in claim 3, in which the addressing system is adapted to control simultaneous switchovers of several active elements belonging to one and the same line or one and the same column of the matrix arrangement.

6. The component as claimed in claim 1, in which the addressing system is adapted to control a switchover of a single active element at a time.

7. The component as claimed in claim 1, in which the active elements are associated with different colors in groups of at least three adjacent active elements.

8. The component as claimed in claim 1, in which at least some of the active elements have dimensions less than 2 mm, even less than 0.5 mm, parallel to the surface of the component.

9. The component as claimed in claim 1, in which at least some of the active elements each comprise a portion based on nematic liquid crystals, and two electrode portions connected to the addressing system and arranged so as to modify an orientation of said nematic liquid crystals, said orientation modification being adapted to produce a switchover of the corresponding active element.

10. The component as claimed in claim 1, in which at least some of the active elements each comprise a portion based on cholesteric liquid crystals, and two electrode portions connected to the addressing system and arranged so as to modify an orientation of said cholesteric liquid crystals, said orientation modification being adapted to produce a switchover of the corresponding active element.

11. The component as claimed in claim 10, in which the portion of cholesteric liquid crystals of some of the active elements has a variable screw pitch in the reflecting state of the corresponding active element.

12. The component as claimed in claim 1, in which at least some of the active elements each comprise liquid crystal droplets dispersed in a matrix, and two electrode portions connected to the addressing system and arranged so as to modify an orientation of said liquid crystals in each droplet, said orientation modification within the droplets being adapted to produce a switchover of the corresponding active element.

13. The component as claimed in claim 1, in which at least some of the active elements each comprise a waveguide portion and a transparent lateral portion in contact with said waveguide portion, said lateral portion having a refractive index that varies between two values which are respectively lower than or equal to and higher than or equal to the value of the refractive index of the waveguide.

14. An image overlaying device for overlaying images comprising:
    a transparent component adapted to transmit, through a surface of said component, light rays originating from a scene situated on a first side of the component to form a first image representative of said scene and visible on a second side of the component, the component being characterized in that it comprises:
        a set of active elements juxtaposed parallel to the surface of the component and each switchable between a transparent individual state and a reflecting individual state;
        an addressing system connected to each active element and suitable for controlling a switching of said element;
        at least one light passage opening; and
        light transmission means arranged between the passage opening and the active elements, so that each active element can establish a light path between said light passage opening and one of the sides of the component when said active element is in the reflecting state;
    the addressing system being further adapted so that a reduced number of active elements are simultaneously in the reflecting state, so that said first image appears permanently through the component, and
        the light transmission means and the active elements being further arranged to conjugate optically points of an additional optical field situated on one and the same side of said light transmission means as the light passage opening with respective points situated outside and at a distance from the component, on one of the first or second sides of said component; and
        a light source arranged to produce light through the passage opening of the component so that said light can be reflected by at least one of the active elements toward the second side of the transparent component, so as to form a second image from a pattern situated in the additional optical field, said second image being visible on the second side of the component and appearing overlaid on the first image.

15. The image overlaying device as claimed in claim 14, in which the addressing system is adapted to successively control switchovers of different active elements, so as to produce the second image by scanning the active elements,
    and in which the reflecting state duration of each active element and the frequency for changing of the active elements that are switched are adapted so that the second image appears continuous for a user of the device.

16. The image overlaying device as claimed in claim 15, in which the duration of the reflecting state of each active element and the frequency for changing the active elements that are switched are adapted so that the second image appears continuous for a user of the device observing said first and second images with the naked eye.

17. The image overlaying device as claimed in claim 14, in which at least some of the active elements each comprise liquid crystal droplets dispersed in a matrix of the active element, and two electrode portions connected to the addressing system and arranged so as to modify an orientation of said liquid crystals in each droplet, said orientation modification within the droplets being adapted to produce a switchover of the corresponding active element, and in which a nature, an orientation and/or a distribution of the droplets in the matrix of the corresponding active element is further adapted to modify a formation of said second image.

18. The image overlaying device as claimed in claim 17, in which a nature, an orientation and/or a distribution of the droplets in the matrix of the corresponding active element is further adapted so that light rays that are reflected by different active elements pass substantially through a common point situated on the second side of the component.

19. The image overlaying device as claimed in claim 14, in which the active elements are adapted to produce the second image in a plane overlaid on a formation plane of the first image when the scene corresponding to said first image is distant from the component.

20. The image overlaying device as claimed in claim 14, further comprising:
    a generator of second image portions arranged in the additional optical field and linked to the addressing system, said generator being adapted to form a portion of the second image from the light produced by the source,
and in which the addressing system is further adapted to control said generator (6) to successively form portions of the second image in a determined order, and to control synchronized switchovers of the active elements in the same order in the surface of the component, so that each second image portion is reflected by an active element and the second image appears reconstructed on the second side of the component.

21. The image overlaying device as claimed in claim 20, in which the generator of second image portions comprises image dots each having a variably modulated intensity.

22. The image overlaying device as claimed in claim 14, forming an optical lens, an ophthalmic lens, a mask lens or a helmet visor.

23. The image overlaying device as claimed in claim 22, forming an ophthalmic lens and in which the active elements are further adapted to correct an ametropia of a wearer of said lens, when said wearer observes at least one of the first and second images.

24. An image viewing and storage device comprising:
    a transparent component adapted to transmit, through a surface of said component, light rays originating from a scene situated on a first side of the component to form a first image representative of said scene and visible on a second side of the component, the component being characterized in that it comprises:
        a set of active elements juxtaposed parallel to the surface of the component and each switchable between a transparent individual state and a reflecting individual state;
        an addressing system connected to each active element and suitable for controlling a switching of said element;
        at least one light passage opening; and
        light transmission means arranged between the passage opening and the active elements, so that each active element can establish a light path between said light passage opening and one of the sides of the component when said active element is in the reflecting state;
    the addressing system being further adapted so that a reduced number of active elements are simultaneously in the reflecting state, so that said first image appears permanently through the component, and
        the light transmission means and the active elements being further arranged to conjugate optically points of an additional optical field situated on one and the same side of said light transmission means as the light passage opening with respective points situated outside and at a distance from the component, on one of the first or second sides of said component;

a photosensitive detector arranged in the additional optical field to receive, through the passage opening of the component, light originating from the scene and reflected by at least one of the active elements during a detection time; and a storage unit connected to the detector so as to store light intensities received by said detector, in which the addressing system is further connected to the detector and to the storage unit so as to transmit to said unit coordinates of an active element in the surface of the transparent component, which is in the reflecting state during the detection time of said detector, and in which the duration of the reflecting state of each active element and the frequency for changing the active elements that are switched are adapted so that the first image formed by the component appears continuous for a user of the device.

25. The image viewing and storage device as claimed in claim 24, in which the detector comprises a matrix of photosensitive elements.

26. The image viewing and storage device as claimed in claim 24, forming an optical lens, an ophthalmic lens, a mask lens or a helmet visor.

27. The image viewing and storage device as claimed in claim 26, forming an ophthalmic lens and further adapted to correct an ametropia of a wearer of said lens when said wearer observes the first image.

* * * * *